(12) United States Patent
Lee et al.

(10) Patent No.: US 7,767,062 B2
(45) Date of Patent: Aug. 3, 2010

(54) SUBMERGED-TYPE ELECTROSORPTION-BASED WATER PURIFICATION APPARATUS AND METHOD THEREOF

(75) Inventors: Jae Bong Lee, Daejeon (KR); Kwang Kyu Park, Daejeon (KR); Hee Moon Eum, Daejeon (KR); Jeon Soo Moon, Daejeon (KR); Phil Yang Park, Daejeon (KR); Seok Won Yoon, Daejeon (KR)

(73) Assignee: Korea Electric Power Corporation (KR)

( * ) Notice: Subject to any disclaimer, the term of this patent is extended or adjusted under 35 U.S.C. 154(b) by 1087 days.

(21) Appl. No.: 11/451,121

(22) Filed: Jun. 12, 2006

(65) Prior Publication Data

US 2007/0284313 A1 Dec. 13, 2007

(51) Int. Cl.
*C02F 1/46* (2006.01)
(52) U.S. Cl. .................. 204/155; 210/748.01; 210/746; 204/536; 204/156; 204/164; 205/57; 205/43
(58) Field of Classification Search ............... 210/746, 210/748, 748.01; 204/450, 632, 156, 536, 204/155; 205/43, 57; 361/502

See application file for complete search history.

(56) References Cited

U.S. PATENT DOCUMENTS

| 5,192,432 | A | 3/1993 | Andelman | 210/198.2 |
| 5,538,611 | A | 7/1996 | Otowa | 204/550 |
| 6,661,643 | B2 * | 12/2003 | Shiue et al. | 361/502 |

* cited by examiner

*Primary Examiner*—Walter D Griffin
*Assistant Examiner*—Cameron J Allen
(74) *Attorney, Agent, or Firm*—Cantor Colburn LLP

(57) ABSTRACT

Provided is a submerged-type, electrosorption-based desalination apparatus for water purification and method, comprising applying a DC voltage of 0.1 to 2.0 volts to a carbon electrode of the reactor to thereby adsorb inorganic ions on the carbon electrode, and reversely applying the same DC voltage having opposite polarity to recycle regeneration solution to the outside of the apparatus or into the treatment tank, thereby enhancing a recovery rate. In addition, in order to improve desalination efficiency, the reactor used in the desalination apparatus may be embodied in various forms of T-shaped, linear type, single, composite, and ion exchange membrane electrodes. Therefore, the present invention may be applied to remove inorganic ions from industrial wastewater, sea water, and brackish water, which contain large amounts of inorganic ions.

13 Claims, 13 Drawing Sheets

SUBMERGED-TYPE ELECTROSORPTION-BASED WATER PURIFICATION APPARATUS AND METHOD THEREOF

FIELD OF THE INVENTION

The present invention relates to a water purification apparatus and method using electrosorption. More specifically, the present invention relates to a submerged-type, electrosorption-based desalination apparatus for water purification and method, comprising submerging an electrosorption-based purification reactor composed of a current collector plate, electrodes and a spacer in treating water, allowing the flow of treating water into the purification reactor using a suction pump, applying a DC voltage of 0.1 to 2.0 volts to a plate-like activated carbon electrode in the purification reactor such that inorganic ions in water are removed by adsorption of ions onto the plate-like activated carbon electrode, thereby converting high-salinity water such as sea water and brine water into fresh water.

DESCRIPTION OF THE RELATED ART

Dryness of electrodes in the air leads to deterioration of adsorption capacity due to the entry of air into pores of the electrodes. That is, conventional desalination methods are susceptible to the risk of electrode dryness during a non-operating period. Occurrence of electrode dryness entails the entry of air into great numbers of pores within carbon electrodes, thereby blocking the entrances of pores. As a result, it is impossible to achieve adsorption of ions into pores during operation of the apparatus. In addition, electrode dryness leads to a decrease in adsorption capacity of the electrodes.

During operation of the apparatus, a DC voltage is applied in a range of 0.8 to 1.4 volts. The thus-applied electrical energy is largely used to adsorb ions, but some electrical energy is utilized in electrolysis of water. The electrolysis is accompanied by formation of gases as shown in the following reactions, and the thus-formed gases enter into numerous pores of the carbon electrodes, thereby blocking pore entrances. Consequently, it is impossible to achieve adsorption of ions into pores during operation of the apparatus, and adsorption capacity of the electrodes is also decreased.

Cathodic reaction: $2Cl^- - 2e^- \rightarrow Cl_2$
$4OH^- - 4e^- \rightarrow O_2 + 2H_2O$
$Cl_2 + H_2O \rightarrow HCl + HClO$
Anodic reaction: $2H^+ + 2e^- \rightarrow H_2$
$2Na^+ + 2e^- \rightarrow 2Na$
$2Na^+ + 2H_2O \rightarrow 2NaOH + H_2$ As state above, the air or gas existing in pores of the carbon electrode is not easily eliminated in conventional desalination methods and remained as such.

For these reasons, a decrease in adsorption capacity of the electrode subsequently leads to a decrease in the recovery rate of the apparatus. In fact, the conventional methods exhibit a recovery rate of about 50%, which is as low as that of a reverse osmosis membrane process, a generalized technology among currently available desalination technologies. In conclusion, the recovery rate is linked directly with energy consumption, and therefore decreased adsorption capacity of the electrode due to the presence of air or gas leads to deterioration in low-energy consumption which is a strong point of the electrosorption-based desalination process.

General electrosorption-based desalination apparatuses use the same flow tube during both purification process operation and regeneration process operation, wherein the end part of the flow tube is branched into two lines. Therefore, such types of desalination apparatuses are operated under fixed operation conditions, irrespective of changes in the water quality, and therefore exhibit disadvantages such as slow responsiveness to changes of the water quality, difficulty to set operation conditions in compliance with such changes and thereby difficulty to accomplish maximization of the recovery rate under given environment.

Due to a very narrow distance of less than 1 mm between electrodes in the purification reactor, it is not easy to remove foreign substances when such materials adhere to fluid flow paths positioned at the inflow water side of the purification reactor or flow paths within other purification reactors. The purification reactor is largely composed of large numbers of structural components including several tens to several hundreds of electrodes, thus taking a great deal of time to disassemble the reactor for removal of foreign substances.

Extension of a flow path via installation of it over the total area of one electrode sheet in a serpentine fashion may enhance a utilization rate of the electrode area, but pose difficulty in realization of large-capacity electrode. Particularly, if a carbon fiber is used as an electrode material, since the contact of some electrode part with water leads to drenching of the electrode throughout the overall electrode by the capillary action of fiber, it is impossible to extend the length of path.

U.S. Pat. No. 5,192,432, issued to Andelman, discloses a spirally wound form of a flow-through capacitor, but suffers from problems such as occurrence of channeling upon the passage of fluid through the spirally wound flow-through capacitor, a fluctuating removal rate of ions, and a low-average removal rate of ions. It is thus difficult to realize industrial scale application with this technique.

U.S. Pat. No. 5,538,611, issued to Otowa, which is an improved version intended to solve shortcomings of U.S. Pat. No. 5,192,432, describes a planar flow-through capacitor. Ths patent may provide some effects of a steady removal rate of ions, but is still unsuitable for industrial-scale treatment due to the configuration with the entry of water from one side of the plate-like electrode and the discharge of water to the opposite side thereof.

Desalination efficiency and recovery rate of the electrosorption-based desalination apparatus are most significantly affected by adsorption capacity of the electrodes in the purification reactor, among a variety of factors. Electrodes used therein may be made of various forms of carbonaceous materials, for example, including carbon cloths (carbon fibers), plate-like carbon electrode sheets and carbon aerogels. The electrodes formed of such materials have their own unique physical and electrochemical properties, but exhibit limitations in their inherent ion adsorption capacity which is known as the most important factor considered for use in the desalination apparatus. In addition, it is not easy to enhance ion adsorption capacity per unit area.

Taken together, the key point required for the electrodes in the desalination apparatus is to enhance the desalination efficiency and recovery rate and also is to reduce power consumption by efficient removal of air or gas adhered to electrodes, enhancement of regeneration efficiency of electrodes and an increase of ion adsorption capacity of an electrode per unit area.

Further, in order to make a contribution to securing of large quantities of alternative water resources using such an apparatus, it is important to easily realize industrial-scale application.

SUMMARY OF THE INVENTION

Therefore, the present invention has been made in view of the above problems, and it is an object of the present invention to enhance desalination efficiency and recovery rate and reduce energy consumption as compared to conventional desalination methods, and to implement a large-capacity apparatus.

In this connection, the desalination efficiency can be defined by Equation 1 below:

$$De(\%)=I/O \times 100 \qquad (1)$$

Where in 1, De represents desalination efficiency (%), I represent the water quality of outflow water, and O represents the water quality of inflow water. The desalination efficiency is one of the indicators representing performance of the apparatus.

The recovery rate can be defined by Equation 2 below:

$$R=P/T \times 100 \qquad (2)$$

Where in, R represents a recovery rate (%), P represents the volume of the produced outflow water ($m^3$), and T represents the volume of the total inflow water ($m^3$). The volume of the produced outflow water refers to the quantity of water discharged from the desalination apparatus during the purification process and is the quantity of water which will be used in various applications. The total inflow water volume can be defined by Equation 3 below:

$$T=P+R \qquad (3)$$

Where in, T represents the volume of the total inflow water ($m^3$), P represents the volume of the produced outflow water ($m^3$), and R represents the volume of the regenerated outflow water ($m^3$). The volume of the produced outflow water refers to the quantity of water discharged from the desalination apparatus during the purification process and is the quantity of water which will be used in various applications. The volume of the regenerated outflow water refers to the quantity of water discharged during the regeneration process and is thus the quantity of water which is discarded. Herein, the purification process refers to a process in which, upon applying a direct voltage to the electrode, inorganic ion components in water, in contact with the electrode, migrate toward the electrode and are adsorbed on the electrode surface, thereby effecting purification of water. The regeneration process refers to a process in which inorganic ions adsorbed onto the electrode during the purification process are desorbed by application of a reverse DC voltage to the electrode, in polarity opposite the DC voltage applied to the electrode during the purification process.

The recovery rate should be considered in combination with energy consumption because only an increase of the recovery rate per se is meaningless. The energy consumption during operation of the apparatus can be defined by Equation 4 below:

$$EC=EP/P \qquad (4)$$

Where in, EC represents energy consumption (kWh/□), EP represents wattage (kWh), and P represents the quantity of the produced outflow water (□). Wattage is the product of instantaneous power (kW) and time (h).

In Equation 2, since the quantity of inflow water, is fixed upon operation of the apparatus, the recovery rate increases with an increase of the quantity of outflow water. That is, an increase in the quantity of outflow water leads to an increase in the recovery rate, and therefore an increasing recovery rate results in reduction of energy consumption as can be seen from Equation 4. In order to decrease energy consumption, various methods may be used including a method of reducing contact resistance of various components in the apparatus, a method of reducing power consumption of a power unit to be used and a method of increasing the recovery rate. Among these methods, it is considered that the method of increasing the recovery rate is most feasible and will provide a large increase in the recovery rate. Therefore, it is very crucial to increase the recovery rate in the electrosorption-based desalination apparatus.

As such, in order to increase the recovery rate, it is necessary to increase the quantity of purified outflow water and decrease the quantity of regenerated outflow water per unit time during operation of the apparatus, as shown in Equations 2 and 3. As a method of increasing the recovery rate, there may be exemplified a variety of methods such as a method of increasing the number of electrodes to be used, a method of increasing unit adsorption capacity of the electrode, and the like. However, the method of increasing the number of electrodes is also accompanied by increased power consumption with increasing electrode numbers and is therefore insignificant. To this end, the technical object of the present invention is to increase the unit adsorption capacity of the electrode.

As such, it is another object of the present invention to provide a submerged-type, electrosorption-based water purification apparatus and method, which are capable of enhancing the desalination efficiency and recovery rate and are capable of reducing power consumption, via efficient removal of air or gas adhered to electrodes, enhancement of regeneration efficiency of electrodes and increase of ion adsorption capacity of an electrode per unit area.

Further, it is a yet another object of the present invention to provide a submerged-type, electrosorption-based water purification apparatus and method, which can be easily applied on industrial scale, so as to make a contribution to securing of large quantities of alternative water resources.

The highly efficient and regenerative, electrosorption-based water purification apparatus according to the present invention comprises a DC power supply system capable of applying negative and positive voltages of 0.1 to 2.0 volts; one or more electrosorption-based purification reactors in tandem or parallel array, connected via voltage-applying lines to the DC power supply system and separately adsorbing/desorbing inorganic ions in water into cations and anions, thereby removing ions; an inflow water storage/purification reaction bath storing water to be treated and having the purification reactor submerged therein; a control panel for setting operation conditions; and an electrical conductivity meter for monitoring the operation state of the apparatus.

According to the present invention, the electrosorption-based purification reactor is comprised of a spacer through which water flows; and positive and negative electrode current collectors made of carbon foil and connected to positive and negative voltage-applying lines of the DC power supply system; and one or more unit cells composed of positive and negative electrodes which adsorb cations and anions by positive and negative voltages via the negative and positive electrode current collectors and are made of activated carbon materials.

In addition, the highly efficient and regenerative, electrosorption-based water purification method according to the present invention comprises applying negative and positive voltages of 0.1 to 2.0 volts from a DC power supply system to one or more positive and negative electrodes positioned in unit cells in one or more parallel electrosorption-based purification reactors in water-submerged state in an inflow water storage/purification reaction bath for 10 to 20 min; selectively adsorbing inorganic ions in introduced water by the positive and negative electrodes, and discharging water while repeating the above same operation in one or more inflow-water storage/purification reaction baths in tandem array; and desorbing the adsorbed inorganic ions by applying the reverse voltages to each electrode upon saturated adsorption thereof, thereby desorbing ions, discharging the supplied regeneration water from each purification reaction bath, and allowing the flow of the treating water using a suction pump, thereby removing inorganic ions.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, the present invention will be described in more detail with reference to the accompanying drawings. Like numbers refer to like elements throughout the specification and drawings.

Figure 1:
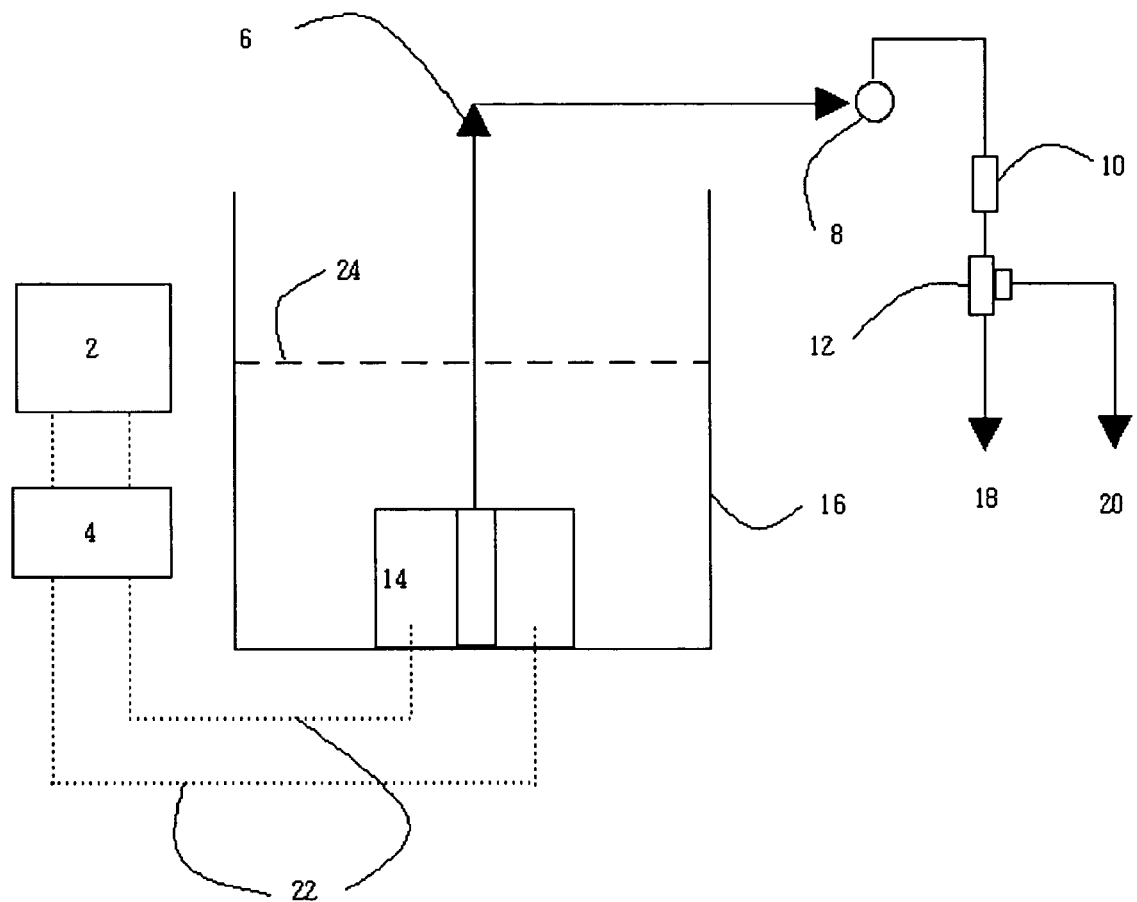
FIG. 1 is a schematic block diagram of a submerged-type, electrosorption-based water purification apparatus in accordance with a first embodiment of the present invention.

FIG. 1 is a schematic block diagram of a submerged-type, electrosorption-based water purification apparatus in accordance with the first embodiment of the present invention. The electrosorption-based water purification apparatus comprises an electrosorption-based purification reactor 14 including an negative electrode to adsorb cations and a positive electrode to adsorb anions, among inorganic ions in water; an inflow water storage/purification reaction bath 16 storing water introduced into the electrosorption-based purification reactor 14 up to a water level 24, and having the purification reactor 14 submerged therein; a DC power supply system 2 for supplying a DC voltage of 0.1 to 2.0 volts, preferably 0.8 to 1.4 volts, to the electrosorption-based purification reactor 14; voltage-applying lines 22 for applying positive and negative DC voltages to the purification reactor 14; a suction pump 8 forming a flow path of water (an arrow direction indicated by reference numeral 6 in FIG. 1) by reduced pressure, from the purification reactor 14 submerged in the inflow water storage/purification reaction bath 16; a three-way valve 12 for transferring the desalination water produced during purification operation to a desalination water storage tank 18 and transferring the discharged regeneration solution to a regeneration solution storage tank 20 upon a regeneration operation; an electrical conductivity meter 10 for setting reference conditions to conduct separate operation of the purification operation and regeneration operation and constantly monitoring the water quality of outflow water; and a control panel 4 for providing various functions such as operation setting conditions of the three-way valve 12, indication of electrical conductivity values, pump starting operation, adjustment of applied voltage, and indication of current values upon operation of the apparatus.

According to the present invention, it is possible to install a plurality of electrosorption-based purification reactors in a tandem or parallel array, in compliance with a water processing capacity of the reactor and target water quality.

The operation procedure of the apparatus in FIG. 1 is initiated by operating the suction pump 8 to allow the flow of water into the regeneration solution storage tank 20 via the three-way valve 12 and reading an electrical conductivity value of water with the electrical conductivity meter 10. Next, a DC voltage of 0.1 to 2.0 volts, preferably 0.8 to 1.4 volts is applied to the electrosorption-based purification reactor 14 for 10 to 20 min, using a DC power supply system 2. When the electrical conductivity value indicated by the electrical conductivity meter 10 drops below a desired base value of water quality, for example below a level of water quality corresponding to that of industrial water upon using the present invention so as to utilize sea water as industrial water via desalination thereof, water is immediately transferred to the desalination water storage tank 18 via the three-way valve 12.

In contrast, when the electrical conductivity value indicated by the electrical conductivity meter 10 rises over the desired base value of water quality, water is immediately transferred again to the regeneration solution storage tank 20 via the three-way valve 12. The water transferred to the regeneration solution storage tank 20 is discharged to the outside.

In the present invention, the above-mentioned procedure is continuously repeated.

Figure 2:
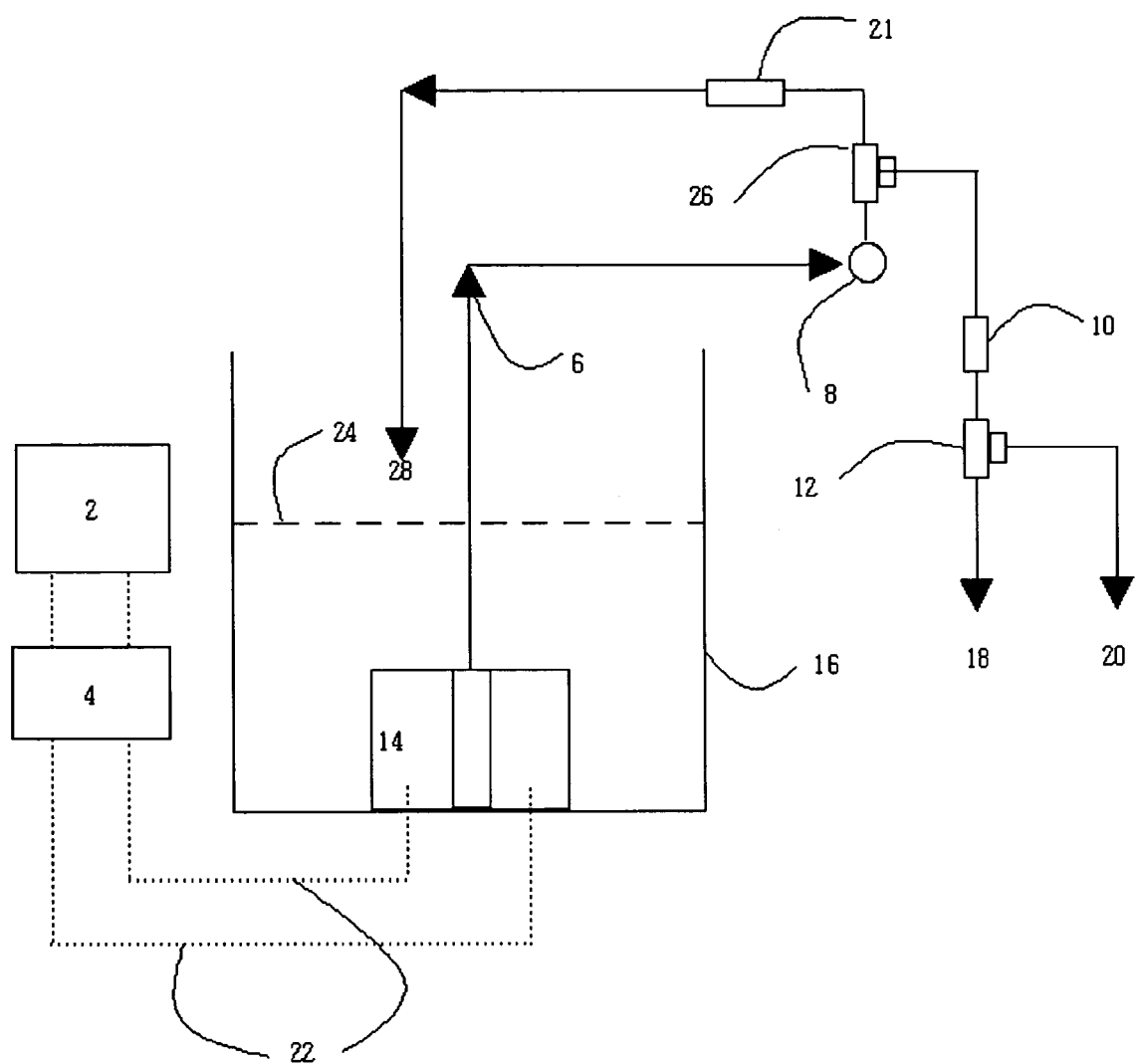
FIG. 2 is a schematic block diagram of a regenerative recycling, submerged-type, electrosorption-based water purification apparatus in accordance with a second embodiment of the present invention.

FIG. 2 is a schematic block diagram of a regenerative recycling, submerged-type, electrosorption-based water purification apparatus in accordance with the second embodiment of the present invention. The electrosorption-based water purification apparatus comprises an electrosorption-based purification reactor 14 including an negative electrode to adsorb cations and a positive electrode to adsorb anions, among inorganic ions in water; an inflow water storage/purification reaction bath 16 storing water introduced into the electrosorption-based purification reactor 14 up to a water level 24, and having the purification reactor 14 submerged therein; a DC power supply system 2 for supplying a DC voltage of 0.1 to 2.0 volts, preferably 0.8 to 1.4 volts, to the electrosorption-based purification reactor 14; voltage-applying lines 22 for applying positive and negative DC voltages to the purification reactor 14; a suction pump 8 forming a flow path of water (an arrow direction indicated by reference numeral 6 in FIG. 2) by reduced pressure, from the purification reactor 14 submerged in the inflow water storage/purification reaction bath 16; a three-way valve 26 for transferring the desalination water produced during a purification operation to a desalination water storage tank 18 and returning the discharged regeneration solution to the inflow water storage/purification reaction bath 16 upon regeneration operation, wherein the flow path upon purification operation is the same as before, when the water quality of the inflow water storage/purification reaction bath 16 becomes worse, i.e. the electrical conductivity value indicated by the electrical conductivity meter 21 rises over a predetermined value, but, under regeneration operation, the regeneration solution is transferred to a regeneration solution storage tank 20 instead of being recycled to the inflow water storage/purification reactor; a three-way valve 12 for transferring the desalination water produced during a purification operation to a desalination water storage tank 18 and transferring the discharged regeneration solution to a regeneration solution storage tank 20 upon a regeneration operation; an electrical conductivity meter 21 for indicating an electrical conductivity value necessary to set operation conditions to switch operation from the regeneration process to the purification process, i.e., in order to transfer water to the desalination water storage tank 18 via the three-way valve 12, when an electrical conductivity value of an electrical conductivity meter 10 indicates a ⅔ level of that of the inflow water; an electrical conductivity meter 10 for setting reference conditions to conduct separate operation in which the flow path is directed to the inflow water storage/purification reaction bath 16 direction (an arrow direction indicated by reference numeral 28 in FIG. 2) or the regeneration solution storage tank 20 direction, upon the purification operation and regeneration operation, and constantly monitoring the water quality of outflow water; and a control panel 4 for providing various functions such as operation setting conditions of the three-way valve 12, indication of electrical conductivity values, pump starting operation, adjustment of applied voltage, and indication of current values upon operation of the apparatus.

According to the present invention, it is possible to install a plurality of electrosorption-based purification reactors in a tandem or parallel array, in compliance with a water processing capacity of the apparatus and target water quality.

The operation procedure of the apparatus in FIG. 2 is initiated by operating the suction pump 8 to allow the circulatory flow of water into the inflow water storage/purification reaction bath 16 using the three-way valve 26 for regenerative recycling, and reading an electrical conductivity value of water with the electrical conductivity meter 21.

Next, a DC voltage of 0.1 to 2.0 volts, preferably 0.8 to 1.4 volts is applied to the electrosorption-based purification reactor 14, using a DC power supply system 2. When the electrical conductivity value indicated by the electrical conductivity meter 21 drops below a desired base value of water quality, water is immediately transferred to the desalination water storage tank 18 via the three-way valve 12. When the electrical conductivity value indicated by the electrical conductivity meter 10 rises over the desired base value of water quality, water is immediately transferred again to the inflow water storage/purification reaction bath 16 via the three-way valve 26 for regenerative recycling. At this time, a DC voltage, which is applied using the DC power supply system 2, is reversely applied, i.e. in an opposite polarity, to the electrosorption-based purification reactor 14.

Then, when an electrical conductivity value of an electrical conductivity meter 21 indicates a ⅔ level of that of the inflow water, a DC voltage is applied again in its original state, i.e. a positive value.

In the present invention, the above-mentioned purification and regeneration processes are repeated.

Provided that the electrical conductivity value of the inflow water storage/purification reaction bath 16 exhibits 1.5 to 2-fold increase as compared to that of raw water which was initially introduced into the inflow water storage/purification reaction bath 16, due to continuous regenerative recycling processes, the regeneration solution in the regeneration process is passed to the regeneration solution storage tank 20 via the three-way valve 26 for regenerative recycling and the three-way valve 12 until the electrical conductivity value of the inflow water storage/purification reaction bath 16 becomes equal to that of raw water introduced into the inflow water storage/purification reaction bath 16.

Figure 3:
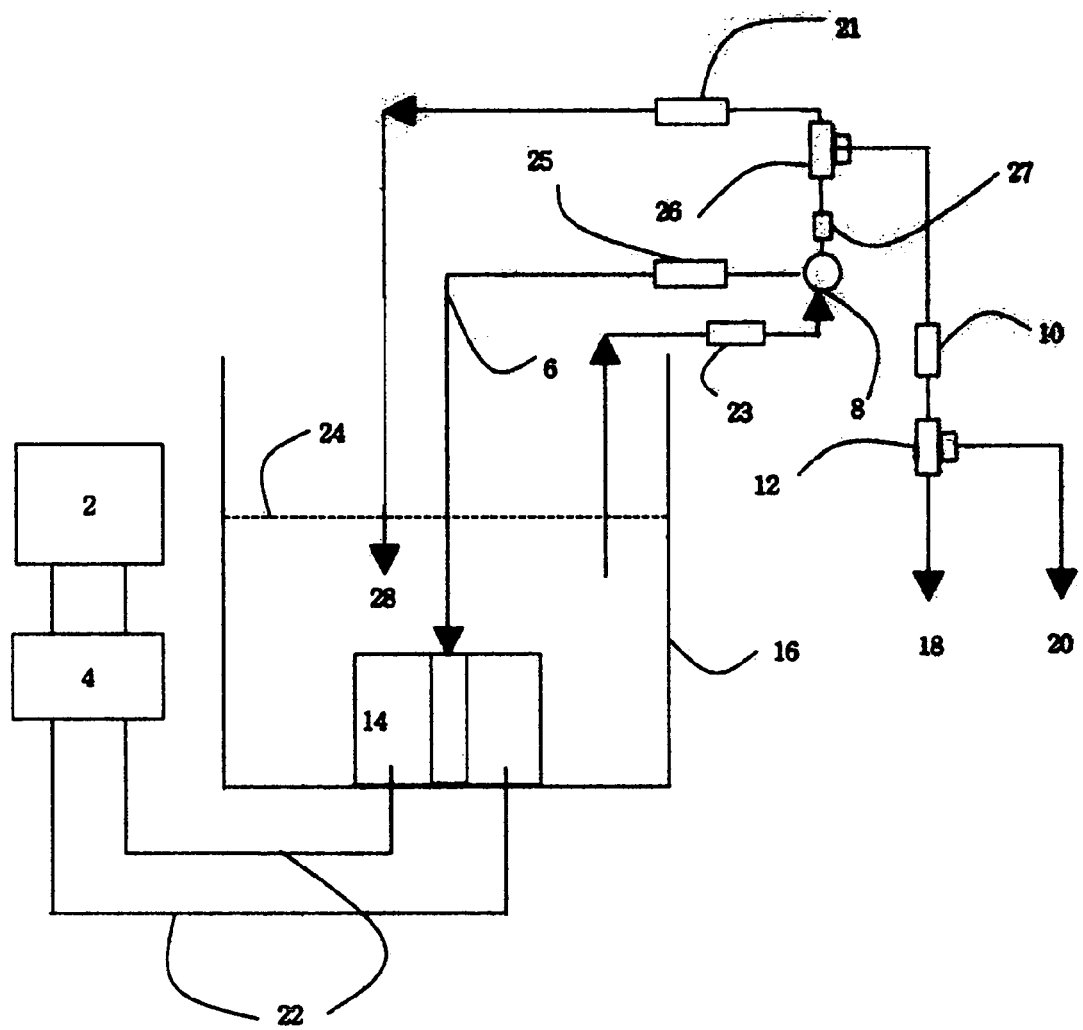
FIG. 3 is a schematic block diagram of a countercurrent regenerative, submerged-type, electrosorption-based water purification apparatus in accordance with a third embodiment of the present invention.

FIG. 3 is a schematic block diagram of a countercurrent, regenerative recycling, submerged-type, electrosorption-based water purification apparatus in accordance with the third embodiment of the present invention. The electrosorption-based water purification apparatus comprises an electro sorption-based purification reactor 14 including an negative electrode to adsorb cations and a positive electrode to adsorb anions, among inorganic ions in water; an inflow water storage/purification reaction bath 16 storing water introduced into the electrosorption-based purification reactor 14 up to a water level 24, and having the electro sorption-based purification reactor 14 submerged therein; a DC power supply system 2 for supplying a DC voltage of 0.1 to 2.0 volts, preferably 0.8 to 1.4 volts, to the electrosorption-based purification reactor 14; voltage-applying lines 22 for applying positive and negative DC voltages to the purification reactor 14; a suction pump 8 forming a flow path of water by reduced pressure, from the purification reactor 14 submerged in the inflow water storage/purification reaction bath 16; a three-way valve 26 for transferring the desalination water produced during a purification operation to a desalination water storage tank 18 and returning the discharged regeneration solution to the inflow water storage/purification reaction bath 16 upon regeneration operation; a three-way valve 12 for transferring the desalination water produced during a purification operation to a desalination water storage tank 18 if the electrical conductivity value of water in the inflow water storage/purification reaction bath 16 rises over a predetermined value, and transferring the discharged regeneration solution to the regeneration solution storage tank 20, upon regeneration operation; an electrical conductivity meter 21 for indicating an electrical conductivity value necessary for setting operation conditions to switch operation from the regeneration process to the purification process, i.e., in order to transfer water via the three-way valve 12 to the desalination water storage tank 18, when an electrical conductivity value of an electrical conductivity meter 10 indicates a ⅔ level of that of the inflow water; a flow meter 27 for indicating an operation flow rate; two-way valves 23 and 25 for permitting counterflow of water (an arrow direction indicated by reference numeral 6 in FIG. 3) against the direction of water flow in the electro sorption-based purification reactor 14 under normal operation, for only one regeneration operation cycle during regeneration operation in order to remove foreign materials caught in the purification reactor 14 only when the operation flow rate is decreased by more than 10% as compared to that of normal operation; an electrical conductivity meter 10 for setting reference conditions to conduct separate operation in which the flow path is directed to the inflow water storage/purification reaction bath 16 direction (an arrow direction indicated by reference numeral 28 in FIG. 3) or the regeneration solution storage tank 20 direction, upon the purification operation and regeneration operation, and constantly monitoring the water quality of outflow water; and a control panel 4 for providing various functions such as operation setting conditions of the three-way valve 12, indication of electrical conductivity values, pump starting operation, adjustment of applied voltage, and indication of current values upon operation of the apparatus.

According to the present invention, it is possible to install a plurality of electrosorption-based purification reactors in tandem or parallel array, in compliance with a water processing capacity thereof and target water quality.

The operation procedure of the apparatus in FIG. 3 is initiated by operating the suction pump 8 to allow the circulatory flow of water into the inflow water storage/purification reaction bath 16 via the three-way valve 26 for regenerative recycling, under the condition in which the two-way valve 25 is closed and the two-way valve 23 is open, and reading an electrical conductivity value of water with the electrical conductivity meter 21.

Next, a DC voltage of 0.1 to 2.0 volts, preferably 0.8 to 1.4 volts is applied to the electrosorption-based purification reactor 14, using a DC power supply system 2. When the electrical conductivity value indicated by the electrical conductivity meter 21 drops below a desired base value of water quality, water is immediately transferred to the desalination water storage tank 18 via the three-way valve 12. When the electrical conductivity value indicated by the electrical conductivity meter 10 rises over the desired base value of water quality, water is immediately transferred to the inflow water storage/purification reaction bath 16 via the three-way valve 26 for regenerative recycling. At this time, a DC voltage, which is applied using the DC power supply system 2, is reversely applied, i.e. in an opposite polarity, to the electrosorption-based purification reactor 14.

Then, when an electrical conductivity value of an electrical conductivity meter 21 indicates a ⅔ level of that of the inflow water, a DC voltage is applied again in a positive value as was applied previously. In the present invention, the above-mentioned purification and regeneration processes are repeated. Provided that the electrical conductivity value of the inflow water storage/purification reaction bath 16 exhibits 1.5 to 2-fold increase as compared to that of raw water which was initially introduced into the inflow water storage/purification reaction bath 16, due to continuous regenerative recycling processes, the regeneration solution in the regeneration process is passed to the regeneration solution storage tank 20 via the three-way valve 26 for regenerative recycling and the three-way valve 12, until the electrical conductivity value of the inflow water storage/purification reaction bath 16 becomes equal to that of raw water introduced into the inflow water storage/purification reaction bath 16.

Meanwhile, in order to remove foreign substances caught in the electrosorption-based purification reactor 14 when the operation flow rate indicated by the flow meter 27 is decreased by more than 10% as compared to that of normal operation, two-way valves 25 and 23 are open to allow the counterflow of water against the direction of water flow in the electrosorption-based purification reactor 14 under normal operation, for only one regeneration operation cycle during regeneration operation. Upon completion of one countercurrent regeneration operation cycle as described above, the above purification operation and regeneration operation are repeated.

Figure 4:
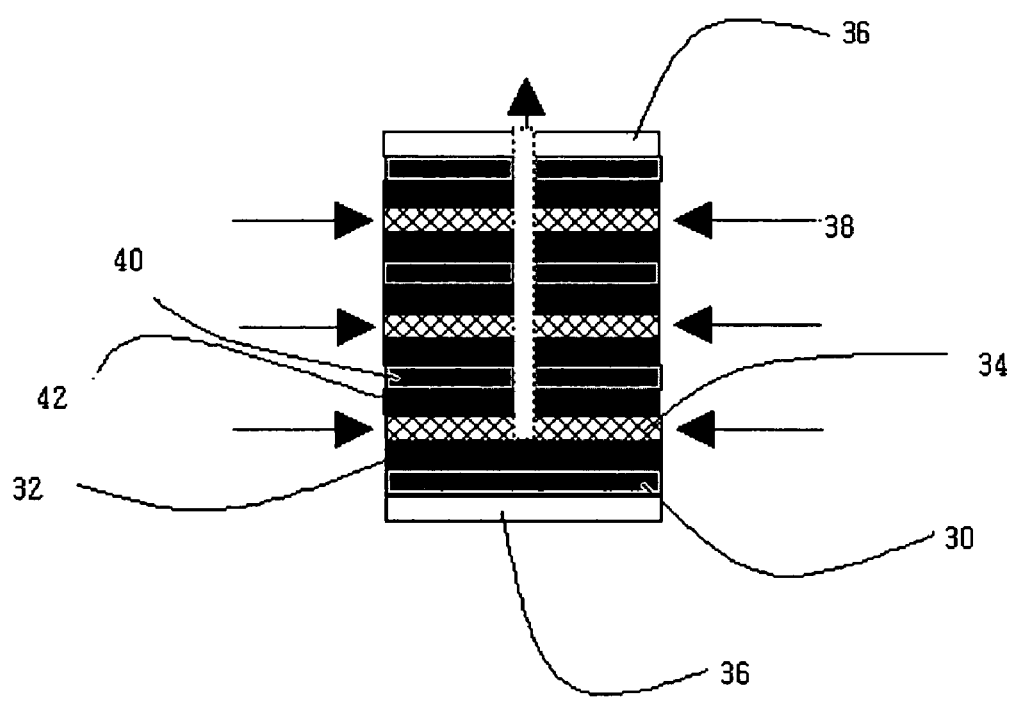
FIG. 4 is a front view of a T-shaped electrosorption-based purification reactor having a rectangular or circular plane, which can be applied to apparatuses of FIGS. 1 through 3.

FIG. 4 is a front view of a rectangular or circular electrosorption-based purification reactor 14, which are applied to apparatuses of FIGS. 1 through 3. This front view is identical to a side view of the reactor 14. This apparatus is comprised of reactor covers 36 for tight coupling between the entire components of the reactor from the top/bottom directions; a positive/negative current collector 30 connected to the positive and negative voltage-applying lines 22 of the DC power supply system 2 and made of carbon foil; a negative/positive current collector 40 connected to the positive and negative voltage-applying lines 22 of the DC power supply system 2 and made of carbon foil and having a charge opposite the positive/negative current collector 30; a negative/positive electrode 32 receiving positive or negative charges from the positive/negative current collector 30, made of an activated carbon material, and adsorbing inorganic ions in water; a positive/negative electrode 42 receiving negative or positive charges from the negative/positive current collector 40, made of the same activated carbon material as the negative/positive electrode 32, and adsorbing inorganic ions in water; and a spacer 34 for uniform formation of water flow between the negative/positive electrode 32 and positive/negative electrode 42.

In FIG. 4, the arrow indicated by reference numeral 38 represents the direction of water flow. Water flows uniformly into the electrosorption-based purification reactor 14 from the edge thereof and is then discharged to the central top part, whereby the reactor has a T-shaped water flow configuration. According to the present invention, it is possible to install increasing numbers of the above components in the form of a multiple stack, depending upon a water processing capacity as desired.

Figure 5:
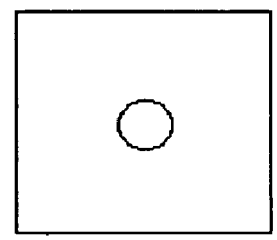
FIG. 5 is a plan view of a rectangular electrosorption-based purification reactor of FIG. 4.
Figure 6:
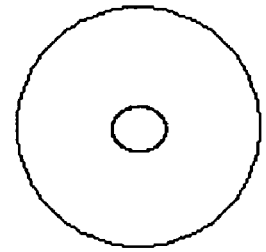
FIG. 6 is a plan view of a circular electrosorption-based purification reactor of FIG. 4.

According to the present invention, the electrosorption-based purification reactor 14 of FIG. 4 may be configured to have a plan view with a rectangular shape as in FIG. 5, or a plan view with a circular shape as in FIG. 6.

Figure 7:
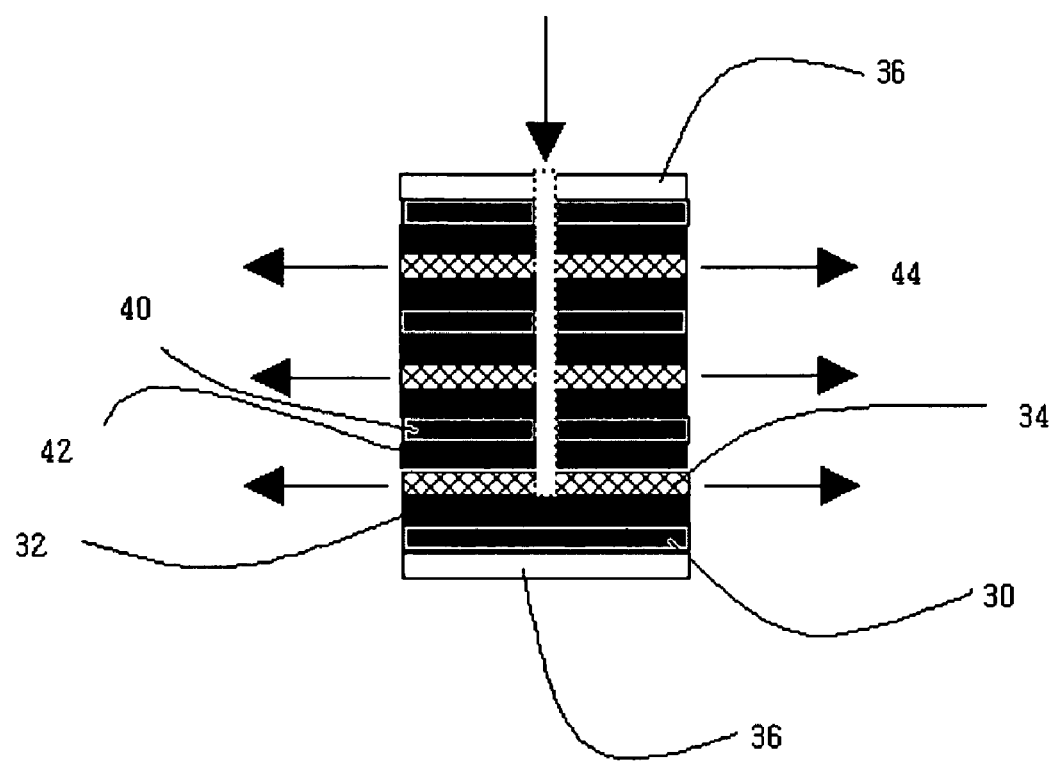
FIG. 7 is a front view identical to FIG. 4 wherein flow of water is in the opposite direction, upon countercurrent-regeneration operation.

FIG. 7 is a front view of an electrosorption-based purification reactor 14 as in FIG. 4, wherein the direction of water flow indicated by the arrow is opposite to the direction of FIG. 4. That is, FIG. 7 shows the direction of water flow upon performing countercurrent-regeneration operation in FIG. 3. Therefore, when the operation flow rate indicated by the flow meter 27 is decreased by more than 10% as compared to that of normal operation, as described in the operation procedure of FIG. 3, water flows in the direction as indicated by the reference numeral 44 in the process by which water is allowed to flow counter currently against the direction of water flow in the electrosorption-based purification reactor 14 under normal operation, by closing the two-way valve 25 and opening the two-way valve 23 for only one regeneration operation cycle during regeneration operation, in order to remove foreign substances stuck to the electrosorption-based purification reactor 14.

Figure 8:
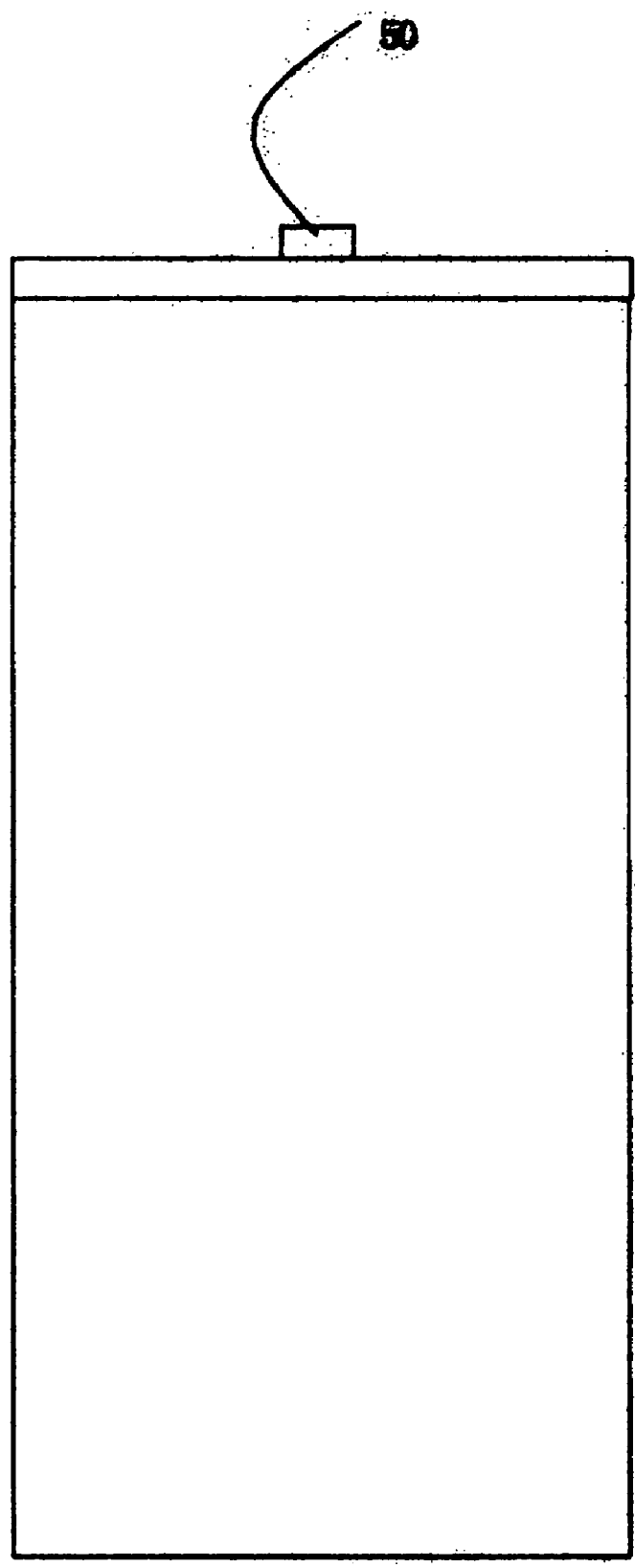
FIG. 8 is a front view of a linear water-flow type, electrosorption-based purification reactor, which can be applied to apparatuses of FIGS. 1 through 3.
Figure 9:
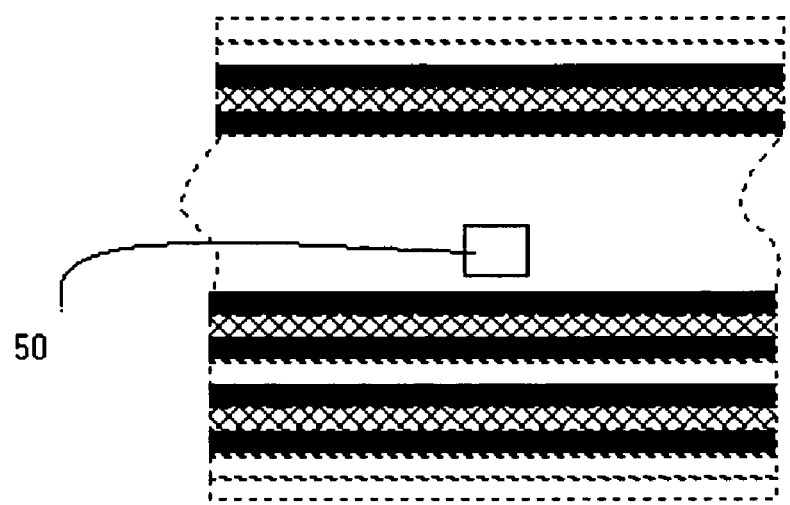
FIG. 9 is a plan view of a linear water-flow type, electrosorption-based purification reactor.

FIG. 8 is a front view of a linear water-flow type, electrosorption-based purification reactor. That is, FIG. 8 shows a front view of a linear water-flow type, electrosorption-based purification reactor 14 among various kinds of electrosorption-based purification reactors 14 which are applied to apparatuses and processes of FIGS. 1 through 3. FIG. 9 is a plan view of a linear water-flow type, electrosorption-based purification reactor 14 of FIG. 8, and FIG. 10 is a side view of a linear water-flow type, electrosorption-based purification reactor 14 of FIG. 8, wherein arrows represent the direction of water flow.

Figure 10:
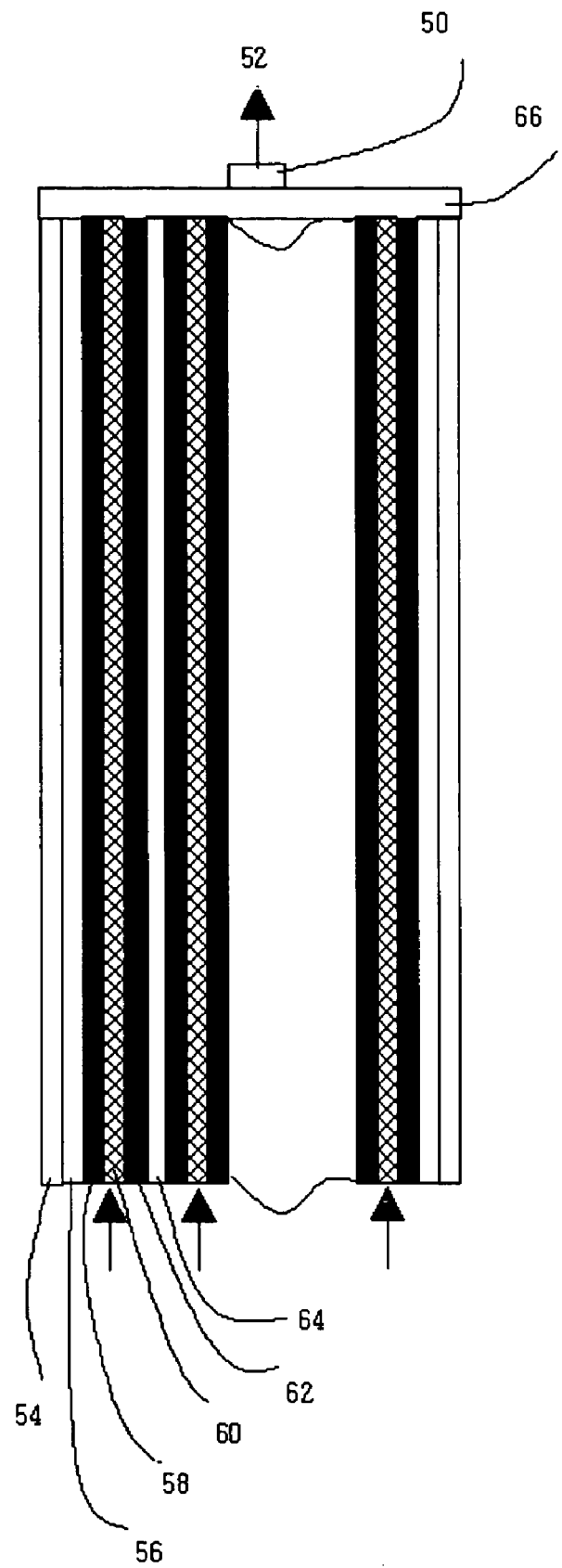
FIG. 10 is a side view of a linear water-flow type, electrosorption-based purification reactor.

Referring to FIGS. 8 through 10, the linear water-flow type, electrosorption-based purification reactor 14 is comprised of reactor covers 54 for tight coupling between the entire components of the reactor from the right/left directions or the top/bottom directions; a positive/negative current collector 56 connected to the positive and negative voltage-applying lines 22 of the DC power supply system 2 and made of carbon foil; a negative/positive current collector 64 connected to the positive and negative voltage-applying lines 22 of the DC power supply system 2 and made of carbon foil and having a charge opposite the positive/negative current collector 56; a negative/positive electrode 58 receiving positive or negative charges from the positive/negative current collector 56, made of an activated carbon material, and adsorbing inorganic ions in water; a positive/negative electrode 62 receiving negative or positive charges from the negative/positive current collector 64, made of the same activated carbon material as the negative/positive electrode 58, and adsorbing inorganic ions in water; and a spacer 60 for uniform formation of water flow between the negative/positive electrode 58 and positive/negative electrode 62.

According to the present invention, it is possible to install increasing numbers of the above components in a multiple stack, depending upon a water processing capacity thereof as desired.

In FIGS. 8 through 10, arrows indicated by reference numeral 52 represent the direction of water flow. Here, the linear water-flow type, electrosorption-based purification reactor 14 takes a water-flow configuration in which water is uniformly introduced into the purification reactor 14 from the bottom side or from either of the left and right sides thereof, is collected in a collecting pipe 66 opposite the direction of water inflow, i.e. at the upper side of the reactor 14 or the central top of right/left side of the reactor 14 and is then discharged via a drain 50.

Figure 11:
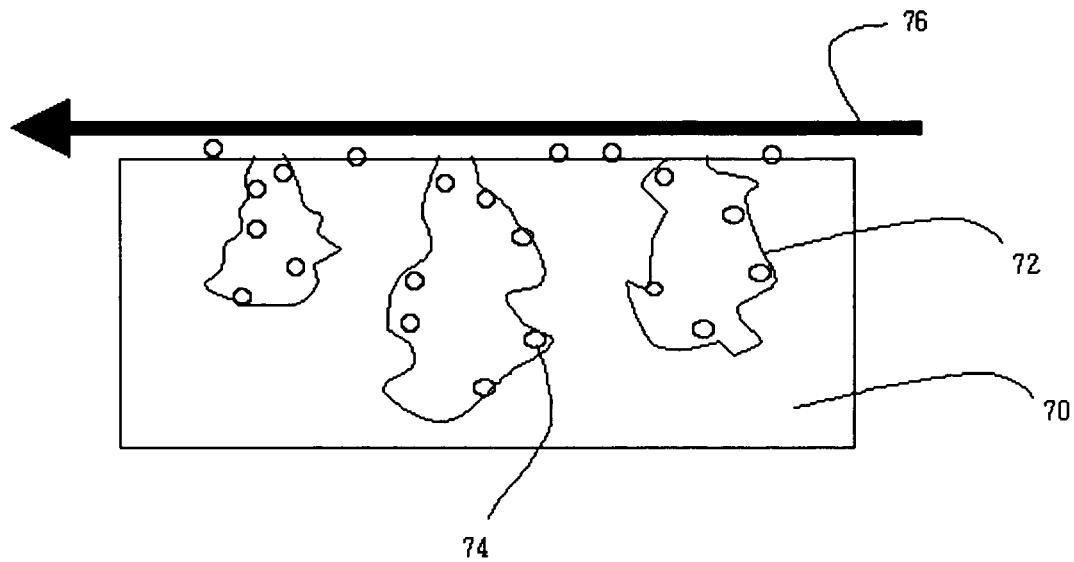
FIG. 11 is a view of air or gas bubble distribution within pores of a carbon electrode.

FIG. 11 shows air or gas bubble distribution within pores of a carbon electrode.

According to FIG. 11, in a variety of activated carbon electrodes 70 having a large surface area of 300 to 4,000 m$^3$/g, there are shown the electrode surface in contact with water flowing along the direction 76 of the water flow path and air or gas bubbles 74 distributed within pores 72 of the electrode. When a DC voltage of 0.8 to 1.4 volts is applied to the activated carbon electrode, the major portion of supplied electrical energy is used to adsorb ions and some energy is used in water electrolysis. Air or gas bubbles are hydrogen or chlorine gas generated during water electrolysis, and air where drying of electrodes takes place, and they may cause clogging of pore entrances of numerous pores existing in carbon electrodes or may occupy the inside space of pores, thereby adversely resulting in decreased ion adsorption capacity of the electrode.

Figure 12:
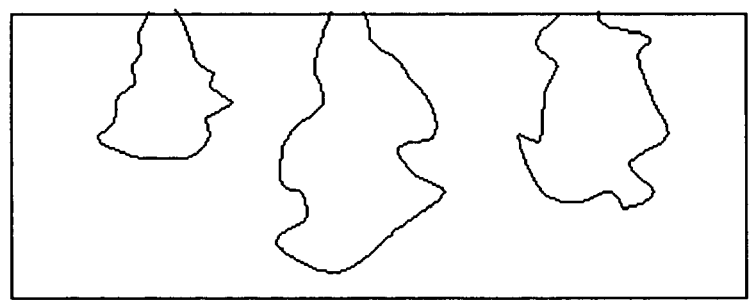
FIG. 12 is a view showing the state of pores in a carbon electrode after operation using a suction pump.

FIG. 12 shows the state of pores in a carbon electrode after operation using a suction pump. It can be seen therefrom that air or gas bubbles 74 shown in FIG. 11 were completely eliminated by suction force of the pump.

Figure 13:
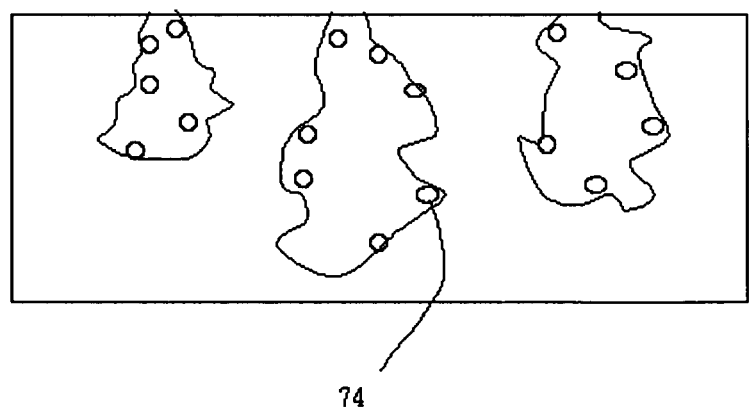
FIG. 13 is a view showing the state of pores in a carbon electrode after operation using a booster pump.

FIG. 13 shows the state of pores in a carbon electrode after operation using a booster pump. As can be seen therefrom, among air or gas bubbles 74 shown in FIG. 11, the air or gas bubbles existing on the electrode surface in contact with water flowing along the direction of the water flow path 76 of the activated carbon electrode 70 were completely removed, but air or gas bubbles 74 clogging pore entrances of numerous pores existing in carbon electrodes or occupying the inside space of the pores still remained without being removed.

Figure 14:
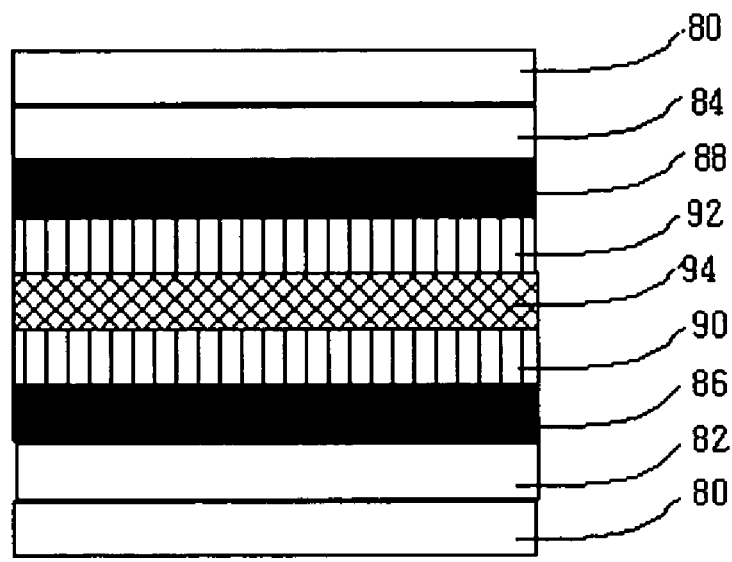
FIG. 14 is a schematic block diagram of a composite electrode type, electrosorption-based purification reactor, which can be applied to apparatuses of FIGS. 1 through 3.

FIG. 14 shows a composite electrode type, electrosorption-based purification reactor which is capable of increasing the adsorption capacity of the electrode two-times that of a conventional single electrode, among components of an electrosorption-based purification reactor 14 illustrated in FIG. 4 or 8.

That is, the composite electrode type, electrosorption-based purification reactor 14 is comprised of reactor covers 80 for tight coupling between the entire components of the reactor from the top/bottom directions; a positive/negative current collector 82 serving to uniformly apply a DC voltage to electrodes; a negative/positive current collector 84 applying charges opposite those of the positive/negative current collector 82; a negative/positive sheet electrode 86 receiving positive or negative charges from the positive/negative current collector 82, adsorbing inorganic ions in water on the electrode surface, and made of a plate-like activated carbon sheet; a negative/positive cloth electrode 90 disposed closely to the negative/positive sheet electrode 86, adsorbing inorganic ions in water on the electrode surface, allowing the passage of surplus ions to reach the negative/positive sheet electrode 86, and made of an activated carbon fiber; a positive/negative sheet electrode 88 receiving negative or positive charges from the negative/positive current collector 84, made of the same activated carbon sheet as the negative/positive sheet electrode 86, and adsorbing inorganic ions in water; a positive/negative cloth electrode 92 disposed closely to the positive/negative sheet electrode 88, adsorbing inorganic ions in water on the electrode surface, allowing the passage of surplus ions to reach the positive/negative sheet electrode 88, and made of an activated carbon fiber; and a spacer 94 for forming a water flow path between the positive/negative cloth electrode 92 and negative/positive cloth electrode 90.

Figure 15:
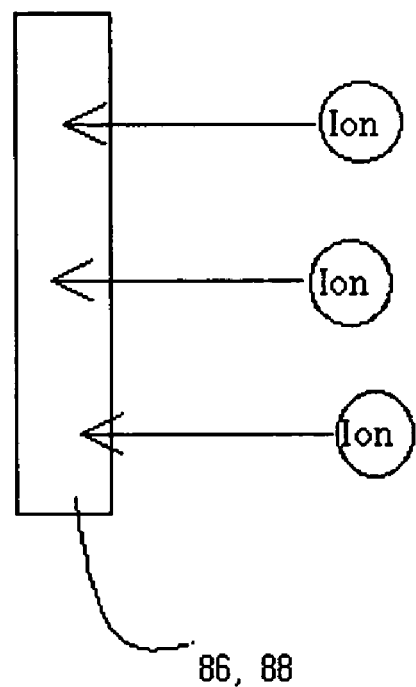
FIG. 15 is a conceptual view to illustrate a migration pattern of ions toward a single electrode in FIG. 14.

FIG. 15 illustrates a migration pattern of ions in a single electrode like the negative/positive sheet electrode 86 or the positive/negative sheet electrode 88 of FIG. 14. Here, ions are adsorbed onto pores inside the electrode without being passed through the electrode.

Figure 16:
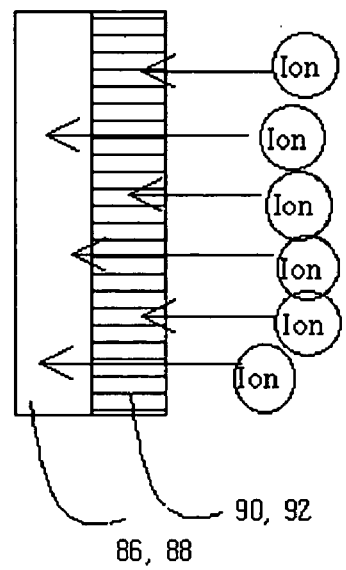
FIG. 16 is a conceptual view to illustrate a migration pattern of ions toward a composite electrode in FIG. 14.

FIG. 16 illustrates ions migrating toward the negative/positive sheet electrode 86 or positive/negative sheet electrode 88 of FIG. 14 and the negative/positive cloth electrode 90 or positive/negative cloth electrode 92 closely adjacent thereto, respectively. Here, ions are not only adsorbed onto surfaces of the cloth electrodes, but also pass through the cloth electrodes, thereby further being adsorbed onto the sheet electrodes. As a result, the overall adsorption capacity increases more than two-times, as compared to use of sheet electrodes alone.

Figure 17:
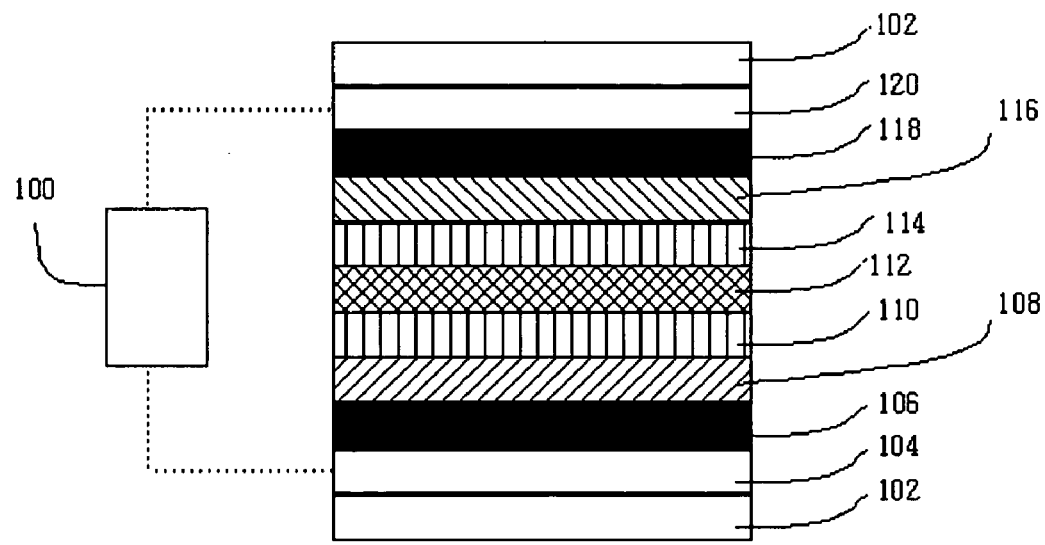
FIG. 17 is a schematic block diagram of an electrosorption-based purification reactor composed of a composite membrane electrode.

FIG. 17 shows the configuration of an electrosorption-based purification reactor 14 composed of a composite membrane electrode. As can be seen therefrom, this apparatus is comprised of reactor covers 102 for tight coupling between the entire components of the reactor from the top/bottom directions or the right/left directions; a positive/negative current collector 104 for uniform application of a positive or negative DC voltage to a negative/positive sheet electrode 106 and a negative/positive cloth electrode 110; a negative/positive current collector 120 for uniform application of a positive or negative DC voltage to a positive/negative sheet electrode 118 and a positive/negative cloth electrode 114; a negative/positive sheet electrode 106 and negative/positive cloth electrode 110, for adsorption of inorganic cations in water on the electrode surface, and made of a plate-like activated carbon sheet; a positive/negative sheet electrode 118 and positive/negative cloth electrode 114, for adsorption of inorganic anions in water on the electrode surface, and made of a plate-like activated carbon sheet; a spacer 112 for forming a water flow path between the negative/positive cloth electrode 110 and positive/negative cloth electrode 114; a cations exchange membrane 108 disposed between the negative/positive sheet electrode 106 and the negative/positive cloth electrode 110 and allowing the passage of cations only; an anion exchange membrane 116 disposed between the positive/negative sheet electrode 118 and positive/negative cloth electrode 114 and allowing the passage of anions only; and a rectifier 100 for applying negative and positive DC power to a positive/negative current collector 104 and negative/positive current collector 120, respectively.

Figure 18:
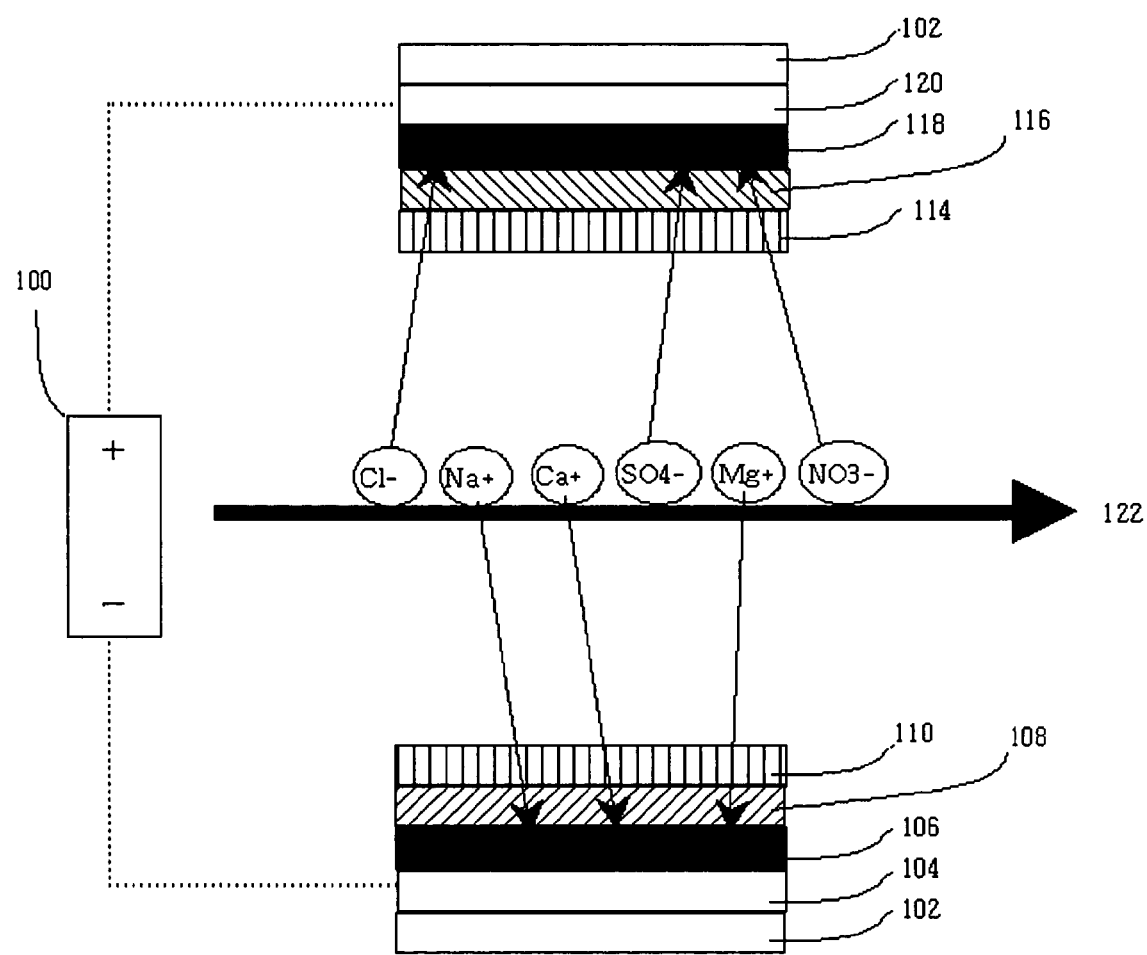
FIG. 18 is a conceptual view to illustrate a migration pattern of ions upon purification operation of an electrosorption-based purification reactor composed of a composite membrane electrode.

FIG. 18 is a view showing a migration pattern of ions in water, during purification operation in a membrane type, electrosorption-based purification reactor of FIG. 17. In FIGS. 17 and 18, like numbers refer to like elements, but the negative/positive sheet electrode 106 is designated as a negative sheet electrode 106 if it is negatively charged, while the negative/positive sheet electrode 106 is designated as a positive sheet electrode 106 if it is positively charged.

In the reactor, water flows along the arrow direction indicated by the reference numeral 122, and only the cations in water pass through the cations exchange membrane 108, and migrate toward the negative sheet electrode 106 which was negatively charged, thereby being adsorbed thereon. Whereas, only the anions in water pass through the anion exchange membrane 116, and migrate toward the positive sheet electrode 118 which was positively charged, thereby being adsorbed thereon. In addition, when the negative sheet electrode 106 is saturated with cations, next cations are then adsorbed on the negative cloth electrode 110 and anions are adsorbed on the positive cloth electrode 114.

Figure 19:
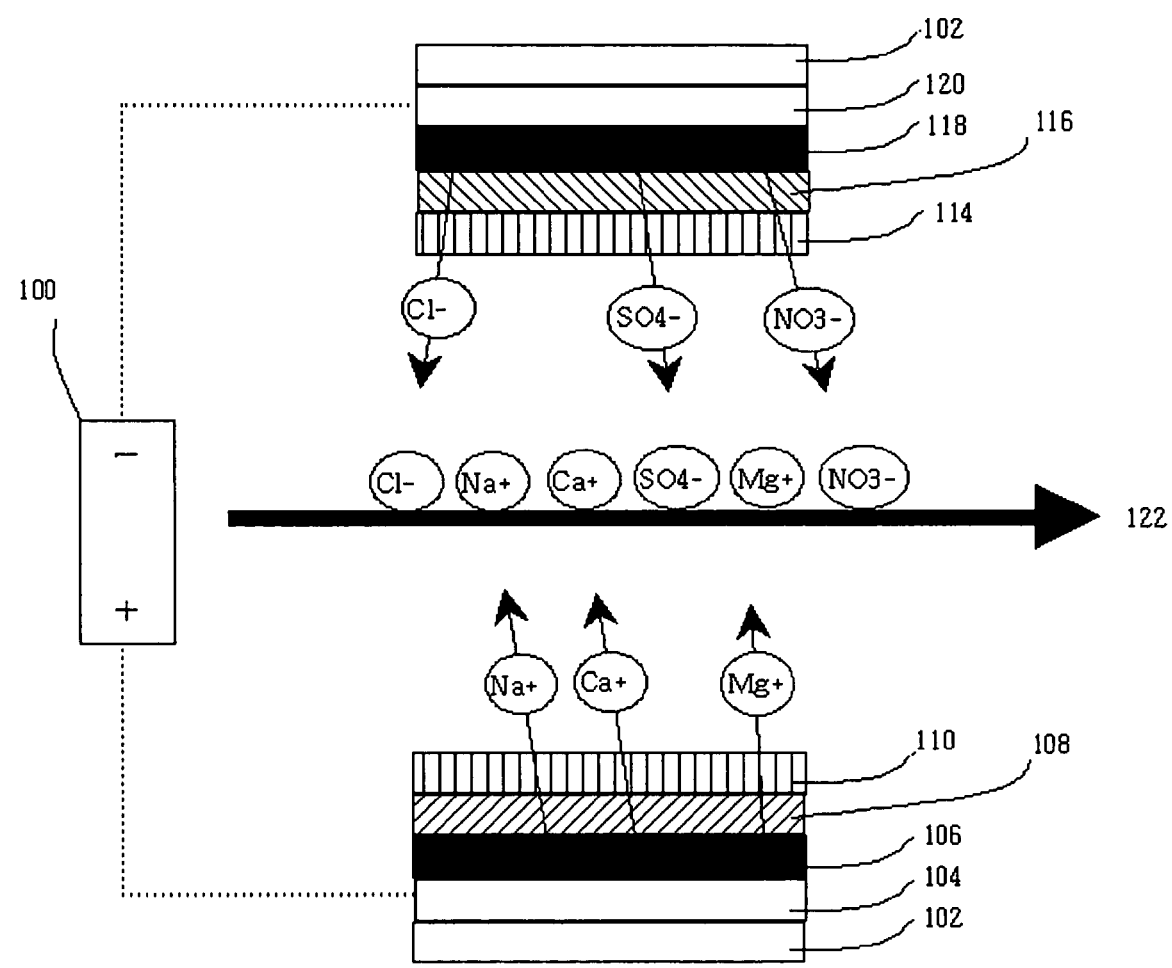
FIG. 19 is a conceptual view to illustrate a migration pattern of ions upon regeneration operation of an electrosorption-based purification reactor composed of a composite membrane electrode.

FIG. 19 is a view showing a migration pattern of ions in water, during regeneration operation in a membrane type, electrosorption-based purification reactor of FIG. 17. Ions, which were adsorbed on the respective electrodes during purification operation in FIG. 18, are desorbed by application of charges during regeneration operation which are opposite ones applied to the respective electrodes during purification operation. At this time desorption of ions without a progress of adsorption occurs only by the action of each ion exchange membrane. Therefore, the regeneration efficiency of the apparatus is further increased as compared to no use of the ion exchange membrane.

The submerged-type, electrosorption-based desalination apparatus of the present invention achieves removal of ionic substances via use of a method involving applying a DC voltage of 0.1 to 2.0 volts, preferably 0.8 to 1.4 volts to a carbon electrode, thereby adsorbing inorganic ions in water thereon, and then applying the same DC voltage having a negative value to the electrode, thereby desorbing the adsorbed inorganic ions therefrom. According to the present invention, the reactor performing such adsorption/desorption functions is submerged in the inflow water storage/purification reaction bath and the suction pump is used to form a water flow path. As a result, the electrode is always submerged in water, and it is thus possible to prevent the electrode from being dried, and it is also possible to easily remove gases existing in pores of the electrode upon occurrence of electrolytic reactions, via formation of a flow path by suction force, thereby resulting in maximized ion-adsorption function and high desalination efficiency of the electrode.

Further, submergence of the electrosorption-based purification reactor in the inflow water storage/purification reaction bath enables easy recycling of regeneration solution into the inflow water storage/purification reaction bath upon regeneration operation. In addition, use of large amounts of water already existing in the inflow water storage/purification reaction bath in admixture with small amounts of the regeneration solution leads to about 30 to 60% increases in the recovery rate, as compared to conventional methods involving disposal of regeneration solution without re-use thereof. When water quality of the inflow water storage/purification reaction bath becomes worse due to continuous operation processes, it is possible to easily conduct operation conditions discarding the regeneration solution in order to normalize the water quality to a level of the inflow water.

Due to submergence of the electrosorption-based purification reactor in the inflow water storage/purification reaction bath, it is possible to easily set operation conditions for purification and regeneration operation by taking factors relating to the water quality such as time and electrical conductivity as input conditions. In addition, submergence of the electrosorption-based purification reactor in water enables counterflow of water in the reactor during regeneration operation and therefore it is possible to easily remove foreign substances, if any, adhered to the reactor.

The electrosorption-based purification reactor utilized in the present invention enables easy stacking of electrodes in a parallel array and it is advantageous to properly adjust the number of electrodes, depending upon the quality of water to be treated. In addition, depending upon the quantity of water to be treated, a plurality of reactors may be easily configured in a tandem or parallel array, thereby enabling industrial-scale treatment of water.

Further, the reactor per se may be conveniently used in the form of a horizontal or vertical structure by changing the position thereof as desired. In the present invention, formation of the water flow path is effected by suction force as discussed hereinbefore. Therefore, by positioning the reactor vertically, it is possible to solve the problem of imbalanced formation of the water flow path suffered by a method involving formation of the water flow path via pressurization. That is, the water flow path may be formed automatically and uniformly in all of the electrodes, by water pressure for the bottom part of the reactor and by suction force for the top part thereof.

Depending upon characteristics of the inflow water storage/purification reaction bath, water quality characteristics and the like, the shape of the reactor may be appropriately and simply selected by replacement with T-shaped reactors shown in FIGS. 4 and 7 or linear type reactors shown in FIGS. 8 through 10. As desalination performance of the reactor is proportional to the length of the electrode, it is possible to use one or more linear type reactors or one or more T-shaped reactors, depending upon the water quality conditions.

Taking all the factors including the water quality conditions and economic efficiency into consideration even upon using electrodes within the reactor, it is possible to increase the desalination performance by about 100 to 150% per cell, via combined use of the carbon electrode sheet and carbon cloth which are common activated carbon electrodes. In addition, the regeneration efficiency may be increased 30 to 60% by use of the ion exchange membrane closely disposed between the carbon sheet electrode and carbon cloth electrode within the composite electrode.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A submerged-type, electrosorption-based water purification apparatus, comprising:
    a plurality of electrosorption-based purification reactors including a negative electrode for adsorbing and desorbing cations and a positive electrode for adsorbing and desorbing anions, among inorganic ions in water, and arranged in a tandem or parallel array;
    an inflow water storage/purification reaction bath 16 for storing water up to a water level, such that the electrosorption-based purification reactor can be submerged;
    a DC power supply system for supplying a positive and negative DC voltage of 0.1 to 2.0 volts to the electrosorption-based purification reactor via voltage-applying lines;
    a suction pump for forming a flow path of water by reduced pressure, in the arrow direction 6 in the drawings, from the electrosorption-based purification reactor submerged in the inflow water storage/purification reaction bath;
    a three-way valve for transferring desalination water produced during a purification operation to a desalination water storage tank, and transferring discharged regeneration solution to a regeneration solution storage tank upon a regeneration operation;
    an electrical conductivity meter for setting reference conditions to conduct separate operation of the purification operation and regeneration operation and constantly monitoring the water quality of outflow water; and
    a control panel providing at least one function of operation setting conditions of the three-way valve, indication of electrical conductivity values, pump starting operation, adjustment of applied voltage, and indication of current values upon operation of the apparatus,
    wherein the electrosorption-based purification reactor is submerged in water to be treated.

2. The apparatus according to claim 1, wherein said submerged-type, electrosorption-based water purification apparatus further includes, for regenerative recycling:
    a three-way valve for transferring the desalination water produced during a purification operation to a desalination water storage tank and returning the discharged regeneration solution to the inflow water storage/purification reaction bath upon a regeneration operation; and
    an electrical conductivity meter for indicating an electrical conductivity value necessary for setting operation conditions to switch operation from the regeneration process to the purification process in order to transfer water to the desalination water storage tank via the three-way valve, when an electrical conductivity value of the inflow water storage/purification reaction bath indicates a ⅔ level of that of the inflow water;
    wherein the electrical conductivity meter is adapted to set reference conditions for separate operation in which the flow path is directed to the inflow water storage/purification reaction bath direction (an arrow direction indicated by reference numeral 28) or the regeneration solution storage tank direction, upon the purification operation and regeneration operation, and constantly monitor the water quality of outflow water.

3. The apparatus according to claim 2, wherein said submerged-type, electrosorption-based water purification apparatus includes, for regenerative recycling by counterflow, a flow meter indicating an operation flow rate and installed between the suction pump and three-way valve; and two-way valves and additionally installed in a water flow path with the electrosorption-based purification reactor and in a water flow path with the inflow water storage/purification reaction bath, respectively, said two-way valves being on/off, upon purification and regeneration operation, to permit counterflow of water against the direction of water flow in the electrosorption-based purification reactor under normal operation, upon regeneration operation, in order to remove foreign substances adhered to the electrosorption-based purification reactor only when the operation flow rate indicated by the flow meter is decreased 10% or higher as compared to that of normal operation.

4. The apparatus according to claim 1, wherein a plurality of the electrosorption-based purification reactor are arranged in a tandem or parallel array, and cell components thereof are composed of:
    reactor covers tightly coupled from top/bottom directions;
    positive/negative current collectors connected to the positive and negative voltage-applying lines of the DC power supply system and made of carbon foil;
    negative/positive electrodes receiving positive or negative charges from the positive/negative current collectors, adsorbing inorganic ions in water and made of an activated carbon material;
    negative/positive current collectors connected to the positive and negative voltage-applying lines of the DC power supply system, having charges opposite the positive/negative current collectors and made of carbon foil;
    positive/negative electrodes receiving negative or positive charges from the negative/positive current collectors, adsorbing inorganic ions in water and made of an activated carbon material; and
    spacers for flow of water formed between the negative/positive electrodes and positive/negative electrodes.

5. The apparatus according to claim 4, wherein said electrosorption-based purification reactor is arranged to have T-shaped configuration of the cell components such that water flows into the reactor from one direction and is then discharged to a central direction upon performing purification and regeneration operation, or is arranged to have linear-type configuration of the cell components such that water flows into the reactor from one direction and is then discharged to the opposite direction.

6. The apparatus according to claim 1, wherein a plurality of electrosorption-based purification reactors are arranged in a tandem or parallel array, and cell components thereof are composed of:
    reactor covers tightly coupled from top/bottom directions;
    positive/negative current collectors connected to the positive and negative voltage-applying lines of the DC power supply system and made of carbon foil;
    negative/positive sheet electrodes receiving positive or negative charges from the positive/negative current collectors, adsorbing inorganic ions in water on the electrode surface and made of a plate-like activated carbon sheet;

negative/positive cloth electrodes disposed closely to the negative/positive sheet electrodes, adsorbing inorganic ions in water on the electrode surface, allowing the passage of surplus ions to reach the negative/positive sheet electrodes, and made of an activated carbon fiber;

negative/positive current collectors connected to the positive and negative voltage-applying lines of the DC power supply system, having charges opposite the positive/negative current collectors and made of carbon foil;

positive/negative sheet electrodes receiving negative or positive charges from the negative/positive current collectors, adsorbing inorganic ions in water and made of a plate-like activated carbon sheet;

positive/negative cloth electrodes disposed closely to the positive/negative sheet electrodes, adsorbing inorganic ions in water on the electrode surface, allowing the passage of surplus ions to reach the positive/negative sheet electrodes, and made of an activated carbon fiber; and spacers for flow of water formed between the negative/positive cloth electrodes and positive/negative cloth electrodes.

7. The apparatus according to claim 6, wherein said electrosorption-based purification reactor further includes, as a composite electrode:

a cation exchange membrane disposed between the negative/positive sheet electrode and the negative/positive cloth electrode and allowing selective passage of cations only;

an anion exchange membrane disposed between the positive/negative sheet electrode and positive/negative cloth electrode and allowing selective passage of anions only; and a rectifier for applying negative and positive DC power to a positive/negative current collector and negative/positive current collector, respectively.

8. A submerged-type, electrosorption-based water purification method, comprising:

introducing water up to a water level in an inflow water storage/purification reaction bath in which an electrosorption-based purification reactor having an negative electrode for adsorbing cations and an positive electrode for adsorbing anions, among inorganic ions in water, is submerged, and then operating only a suction pump to allow the flow of water into a regeneration solution storage tank via a three-way valve;

applying a DC voltage of 0.1 to 2.0 volts from a DC power supply system to the electrosorption-based purification reactor via voltage-applying lines for 10 to 20 min;

transferring water to a desalination water storage tank via said three-way valve, if an electrical conductivity value indicated by an electrical conductivity meter installed between the suction pump and three-way valve drops below a desired base value of water quality; and transferring water to the regeneration solution storage tank via said three-way valve, if the electrical conductivity value rises above the desired base value of water quality.

9. The method according to claim 8, wherein the purification method includes, for regenerative recycling:

additionally operating only the suction pump to allow the circulatory flow of water into the inflow water storage/purification reaction bath via the three-way valve for regenerative recycling additionally installed between the suction pump and electrical conductivity meter, and reading an electrical conductivity value of water with the electrical conductivity meter;

immediately transferring water to a desalination water storage tank via the three-way valve, if the electrical conductivity value indicated by the electrical conductivity meter drops below a desired base value of water quality, and immediately transferring water to an inflow water storage/purification reaction bath via the three-way valve for regenerative recycling, if the electrical conductivity value indicated by the electrical conductivity meter rises above the desired base value of water quality; and applying to the electrosorption-based purification reactor a reverse voltage opposite a DC voltage applied for purification operation, by a DC power supply system upon regenerative recycling.

10. The method according to claim 8, wherein said electrosorption-based purification reactor is configured such that water is introduced from the one direction of a cell constituting the reactor and is discharged to the opposite direction or the central direction.

11. The method according to claim 9, wherein a DC voltage is applied again in a positive value as originally applied, when an electrical conductivity value indicated by the electrical conductivity meter is a $2/3$ level of that of inflow water.

12. The method according to claim 9, wherein water is transferred to the regeneration solution storage tank until the electrical conductivity value between inflow water of the inflow water storage/purification reaction bath and raw water becomes equal to each other, when the electrical conductivity value of the inflow water in the inflow water storage/purification reaction bath 16 upon regeneration operation is increased 1.5 to 2-times as compared to that of raw water.

13. The method according to claim 8, wherein the purification method includes, for countercurrent regenerative recycling, additionally installing two-way valves between the suction pump and electrosorption-based purification reactor and between the suction pump and inflow water storage/purification reaction bath, respectively; closing the two-way valve and circulating water into the inflow water storage/purification reaction bath via the two-way valve and the three-way valve for regenerative recycling, followed by reading an electrical conductivity value of water with the electrical conductivity meter; upon performing a countercurrent operation process to remove foreign substances from the electrosorption-based purification reactor, confirming an operation flow rate via a flow meter installed between the suction pump and the three-way valve for regenerative recycling, and closing the two-way valve and transferring water into the inflow water storage/purification reaction bath via the two-way valve, in the opposite direction.

* * * * *